United States Patent [19]

Ueda et al.

[11] Patent Number: 5,322,896

[45] Date of Patent: Jun. 21, 1994

[54] PROCESS FOR PRODUCING IMPROVED WATER ABSORBING RESIN AND RESIN MADE BY THE SAME

[75] Inventors: Shigeki Ueda, Aichi; Kenji Tanaka, Shiga, both of Japan

[73] Assignee: Sanyo Chemical Industries, Ltd., Kyoto, Japan

[21] Appl. No.: 2,346

[22] Filed: Jan. 6, 1993

[30] Foreign Application Priority Data

Jan. 28, 1992 [JP] Japan .................... 4-38634

[51] Int. Cl.$^5$ .................... C08J 3/24; C08F 8/32; C08L 33/02; C08L 63/10
[52] U.S. Cl. .................... 525/119; 525/107; 525/113; 525/115; 525/327.4; 525/327.6; 525/329.4; 525/329.5; 525/329.7; 525/329.9; 525/382; 525/384; 525/385; 525/396; 525/419
[58] Field of Search .............. 525/119, 113, 115, 382, 525/329.9; 526/317.1

[56] References Cited

U.S. PATENT DOCUMENTS

| | | | |
|---|---|---|---|
| 4,541,871 | 9/1985 | Obayashi | 106/197.2 |
| 4,666,975 | 5/1987 | Yamasaki | 524/733 |
| 4,783,510 | 11/1988 | Saotome | 525/329.7 |
| 5,140,076 | 8/1992 | Hatsuda | 525/375 |
| 5,164,459 | 11/1992 | Kimura | 525/384 |

FOREIGN PATENT DOCUMENTS

| | | |
|---|---|---|
| 57-44627 | 3/1982 | Japan . |
| 59-62665 | 4/1984 | Japan . |
| 60-147475 | 8/1985 | Japan . |
| 60-163956 | 8/1985 | Japan . |

*Primary Examiner*—Fred Zitomer
*Attorney, Agent, or Firm*—Wegner, Cantor, Mueller & Player

[57] ABSTRACT

The invention relates to a process for producing improved water absorbing resin comprising the steps of treating water absorbing resin particles (A) with an aqueous solution of a water-soluble compound (B) and a crosslinking agent (C), reacting, and obtaining resin particles crosslinked in the surface vicinity; and a water absorbing resin obtained by this process possessing the absorption characteristics of an absorbency under a pressure-free state of 50 times or more to physiological saline solution, and an absorbency under the pressurized state of 30 times or more to physiological saline solution. The water-soluble compound (B) is at least one water-soluble compound selected from the group consisting of alkylene-oxide adducts of monofunctional alcohols (1), a monofunctional salts of organic acids (2), and lactams (3), and inert to (A) and (C); and the crosslinking agent (C) has two or more functional groups capable of reacting with (A). The obtained improved water absorbing resin possesses an excellent absorbing capacity whether under no pressure or under pressure, and does not form lumps when brought into contact with water. The initial absorption rate is superior, and the dry feeling of the gel after absorbing water is excellent. Therefore, it is used beneficially as a sanitary material, cold insulating material, water sealing materials, and many others.

11 Claims, No Drawings

PROCESS FOR PRODUCING IMPROVED WATER ABSORBING RESIN AND RESIN MADE BY THE SAME

BACKGROUND OF THE INVENTION

1. Field of the Invention

The present invention relates to a process for producing an improved water absorbing resin, and a water absorbing resin obtained by the process. More specifically, it relates to a process for producing an improved water absorbing resin by treating and crosslinking the vicinity of the surface of water absorbing resin particles with an aqueous solution of a specific water-soluble compound and a crosslinking agent, and a water absorbing resin obtained by the same process having a large absorbing ability in all circumstances, whether in a pressure-free state or in a pressurized state.

2. Description of the Prior Art

Hitherto, water absorbing resins have been widely used in hygienic materials such as sanitary materials and paper diapers, water retainers for soil, and others. Examples of such water absorbing resins are known to include crosslinked polyacrylic acid salts, self-crosslinking type polyacrylic acid salts, crosslinked copolymers of starch-grafted acrylic acid salts, copolymers of vinyl alcohol-acrylic acid salt, hydrolyzates of crosslinked copolymer of acrylamide, neutralized copolymers of crosslinked isobutylene-maleic anhydride, and crosslinked carboxy methyl cellulose salts.

The method for obtaining a water absorbing resin is mainly intended to make a water-soluble resin insoluble in water by slightly crosslinking. The crosslinking methods thereof include a method of adding a crosslinking agent when polymerizing a hydrophilic monomer and crosslinking simultaneously with polymerization, or a method of uniform crosslinking between molecules of water soluble polymers by reacting crosslinking agent to the water-soluble polymers.

The water absorbing resins obtained by these crosslinking methods have a minimized content of the crosslinking agent in order to enhance the absorbency. Accordingly, the water absorbing resin is weak in the gel strength and low in the absorbency under pressure. Moreover, inside the water absorbing resin, water-soluble components coexist, which are responsible for lowering the absorption rate, lowering the stability of the water absorbing gel by elution of water-soluble components after absorption, and deterioration of the dry feeling of water absorbing gel. On the other hand, the method of enhancing the crosslinking density by increasing the use of crosslinking agent is also known, but when uniformly crosslinked at high density, the absorption capacity, which is the basic feature of the water absorbing resin, is lowered, which is not preferable.

To solve these problems, as shown in items ① to ④ below, methods for reforming the water absorbing resin particles have been proposed.

① Method of dispersing a water absorbing resin in a large quantity of organic solvent such as alcohol, ketone and ether containing water, and crosslinking by adding a crosslinking agent (Japanese Patent Application Laid Open No. 44627/1982).

② Method of crosslinking a water absorbing resin in water containing state with the water content adjusted to 10 to 40 wt. % (Japanese Patent Application Laid Open No. 62665/1984).

③ Method of absorbing crosslinking agent and water into water absorbing resin in the presence of inorganic powder to avoid the coagulation, and heating while stirring so as to crosslink and remove water simultaneously (Japanese Patent Application Laid Open No. 163956/1985).

④ Method of crosslinking by dispersing in a large quantity of hydrophilic inert solvent with boiling point of 100° C. or higher, in the presence of 1.5 to 5.0 parts by weight of water and inert inorganic powder, to 1 part by weight of water absorbing resin (Japanese Patent Application Laid Open No. 147475/1985).

Of these reforming methods, however, in the method of ①, although a water absorbing resin with an improved absorption rate is obtained, a step for removing a large amount of the organic solvent having low boiling point is required, and it is hardly suited to industrial application. Furthermore, in this step of removing the organic solvent, the crosslinking agent permeates into the central part of the water absorbing resin particles together with the concentrated moisture so as to crosslink up to the inside of the resin particles, thereby lowering the absorption performance or mutually coagulating the water absorbing resin particles by means of the concentrated moisture to form lumps, and the working efficiency is poor.

In the method of ②, the crosslinking agent permeates into the central part of the water absorbing resin particles containing large amount of water to crosslink up to the inside of the resin particles, and the absorption performance is lowered, and the water absorbing resin particles containing water are mutually coagulated to form lumps.

In the methods of ③ and ④, the mutual coagulation of water absorbing resin particles may be somewhat prevented by the presence of the inorganic powder, but since the crosslinking agent is adsorbed not only by the water absorbing resin but also by the inorganic powder, crosslinking tends to become nonuniform, and sufficient performance may not be always exhibited. Furthermore, in the method of ④, since a large amount of water of 1.5 to 5.0 times of the water absorbing resin is used, the crosslinking agent may permeate into the central part of the water absorbing resin containing water, and the absorption performance is lowered.

SUMMARY OF THE INVENTION

The present inventors intensively investigated to solve the problems in the methods of ① to ④, and finally discovered a process for producing an improved water absorbing resin capable of crosslinking the surface vicinity of the resin particles efficiently and homogeneously without causing mutual coagulation of water absorbing resin particles, even when the water absorbing resin particles are treated by using the crosslinking agent in a state of an aqueous solution, and when crosslinking in the state of absorbing a minimized amount of water in the water absorbing resin particles. The water absorbing resin obtained by this process is a highly water absorbing resin having a great absorbing capacity and an excellent initial absorption rate, whether in a pressure-free state or in a pressurized state, thereby reaching the invention.

It is an object of the invention to provide a process for producing an improved water absorbing resin capable of crosslinking the surface vicinity of resin particles efficiently and homogeneously, without causing mutual coagulating of water absorbing resin particles, even if the water absorbing resin is treated by using the crosslinking agent in a state of aqueous solution.

It is another object of the invention to provide a process for producing an improved water absorbing resin having a large absorbing capacity in a pressure-free state or in a pressurized state and an excellent initial absorption rate.

It is still another object of the invention to provide a water absorbing resin having a large absorbing capacity in a pressure-free state or in a pressurized state and an excellent initial absorption rate.

It is a further object of the invention to provide a water absorbing resin excellent in the dry feeling of resin gel after aqueous liquid absorption, crisp in touch, less clammy, and improved in slipperiness.

Namely, the present invention relates to a process for producing improved water absorbing resin comprising the steps of treating water absorbing resin particles (A) with an aqueous solution of a water-soluble compound (B) designated below and a crosslinking agent (C) designated below, reacting, and obtaining resin particles crosslinked in the surface vicinity; and a water absorbing resin obtained by this process and having the absorption characteristics of an absorbency under a pressure-free state of 50 times or more to physiological saline solution, and an absorbency under a pressurized state of 30 times or more to physiological saline solution.

Water-soluble compound (B): At least one water-soluble compound selected from the group consisting of an alkylene oxide adduct of monofunctional alcohol (1), a monofunctional salt of organic acid (2), and a lactam (3), and inert to (A) and (C).

Crosslinking agent (C): A crosslinking agent having two or more functional groups capable of reacting with (A).

DETAILED DESCRIPTION OF THE INVENTION

In the invention, the water absorbing resin particles (A) are practically dry particles of a resin (water absorbing resin) which absorbs a large amount of water when in contact with water, and is swollen, and forms a hydrous gel (hydrogel). Such a water absorbing resin is not particularly limited, and its examples include crosslinked partially neutralized polyacrylic acid, self-crosslinked partially neutralized polyacrylic acid, crosslinked copolymers of starch-grafted acrylic acid salt, hydrolyzates of crosslinked copolymers of starch-grafted acrylonitrile, copolymers of vinyl alcohol-acrylic acid salt, hydrolyzates of crosslinked copolymers of acrylic acid salt-acrylamide or crosslinked copolymers of acrylic acid salt-acrylonitrile, crosslinked copolymers of acrylic acid salt and 2-acrylamide-2-methylpropane sulfonic acid salt, neutralized copolymers of crosslinked isobutylene-maleic acid anhydride, and crosslinked carboxymethylcellulose salt, and one or more types of these resins may be used. As the salts used in these examples, sodium salt, potassium salt, ammonium salt, amine salt or the like may be used. The preferable one among them may include, considering the high water absorbing property obtained finally, water absorbing resins having a carboxyl group and/or carboxylate group, and in particular crosslinked copolymers of an ethylenic unsaturated monomer having acrylic acid or its salt as the principal constituent unit. As the acrylic acid salt, the same salts as mentioned above may be used.

The shape of the water absorbing resin particles (A) is not particularly specified, and various shapes may occur due to differences in the producing process. Examples include a pearly shape obtained by reverse phase suspension polymerization, a scale like piece shape obtained by drum drying, a rock shape obtained by grinding resin lumps, and an amorphous state. Any shape may be applicable, and the particle size is not particularly defined, and is usually around 10 to 1,000 $\mu$m. The water absorbing resin particles (A) are practically dry particles.

In the invention, the water-soluble compound (B) is at least one water-soluble compound selected from the group consisting of an alkylene oxide adduct of monofunctional alcohol (1), a monofunctional salt of organic acid (2), and a lactam (3), and is inert to (A) and (C).

Examples of the alkylene oxide adduct of monofunctional alcohol (1) include ethylene oxide adduct of methanol, ethylene oxide adduct of ethanol, ethylene oxide adduct of butyl alcohol, and ethylene oxide/propylene oxide adduct of methanol. The number of carbon atoms in the monofunctional alcohol component is desired to be about 1 to 5, while the number of carbon atoms in the alkylene group of alkylene oxide components is desired to be about 2 to 4.

Examples of the monofunctional salt of organic acid (2) may include, among others, an alkaline metal salt of an organic acid, an amine salt, and an ammonium salt, and more specifically sodium acetate, potassium acetate, ammonium acetate, sodium propionate, potassium propionate, ammonium propionate, sodium lactate, and potassium lactate. As the organic acid component, organic acids with about 2 to 6 carbon atoms are preferable, and in the case of amine acid, the amine component is preferably an amine with about 1 to 6 carbon atoms.

Examples of lactams (3) include, among others, $\beta$-propiolactam, $\gamma$-butyrolactam, $\delta$-valerolactam, and $\epsilon$-caprolactam. The number of carbon atoms of the lactams is desired to be 3 to 9.

Of the examples of (B) presented above, more preferable ones are ethylene oxide adducts of monofunctional alcohol, alkaline metal salts of organic acids, and cyclic lactam with 4 to 8 carbon atoms; and particularly preferable ones are ethylene oxide 2 to 10 mols adduct of monofunctional alcohol, alkaline metal salt of propionic acid, and $\epsilon$-caprolactam.

In the invention, the concentration of the aqueous solution of water-soluble compound (B) may vary depending on the type of (B), and it is preferable to set the concentration so that the absorbency of the water absorbing resin particles (A) to the aqueous solution of (B) may be 5 times or less, in particular, 3 times or less. The absorbency herein refers to the value measured in the same method as the absorbency under the pressure-free state mentioned below, except that the aqueous solution of (B) is used instead of the physiological saline solution.

Although the concentration varies depending on the type of (B), it usually falls within a range of 2 to 60 wt. %, or preferably 5 to 50 wt. %. However, when the alkylene oxide adduct of monofunctional alcohol (1) is used as (B), it is desired to be in a range of 10 to 40 wt. %, and when the monofunctional salt of organic acid (2) or lactam (3) is used as (B), it is desired to be in a range of 5 to 35 wt. %, in particular.

If the concentration is less than 2 wt. %, the absorbency of (A) to the aqueous solution (B) exceeds 5 times. In this case, when (A) is treated with the aqueous solution (B) and the crosslinking agent (C) mentioned below, (A) becomes partly swollen, and swollen particles are apt to coagulate each other to form lumps. It also is hard to crosslink homogeneously the surface vicinity of (A), and the handling property is lowered. On the other hand, if the concentration exceeds 60 wt. %, in order to maintain the water content necessary for the crosslinking reaction of (A) and (C), it is necessary to use a large volume of water-soluble compound (B), which is very uneconomical.

The amount of the aqueous solution (B) used for the water absorbing resin particles (A) in the invention varies with the type and concentration of (B), and type and dose of the crosslinking agent (C), and the ratio of (A):(B) aqueous solution (by weight) is usually 100:(1 to 10), or preferably 100:(2 to 8), and more preferably 100:(2 to 5). If the rate of the aqueous solution (B) is less than 1, it is hard to perform the crosslinking reaction homogeneously. If exceeding 10, not only may the crosslinking reaction take a longer time, but also the absorption performance may be lowered because the aqueous solution gradually permeates to the central part of (A) together with the crosslinking agent (C) to advance the crosslinking reaction nearly to the central part, so that it is not practical for producing an improved water absorbing resin.

In the invention, the crosslinking agent (C) is a compound having two or more functional groups that may react with (A), and such compound may be used without any particular limitation. More preferably, a water-soluble crosslinking agent may be used.

Examples of crosslinking agent (C) may include polyglycidyl ether compounds, haloepoxy compounds, polyaldehyde compounds, polyfunctional alcohols, and polyamine compounds, and two or more types of them may be used in combination.

Practical examples of polyglycidyl ether compound include ethylene glycol diglycidyl ether, propylene glycol diglycidyl ether, glycerin-1,3-diglycidyl ether, glycerin triglycidyl ether, polyethylene glycol diglycidyl ether, and 1,6-hexane diol diglycidyl ether, etc.

Practical examples of haloepoxy compounds include epichlorohydrin and α-methyl epichlorohydrin, etc.

Practical examples of polyaldehyde compounds include glutaraldehyde and glyoxazal, etc.

Practical examples of polyfunctional alcohols include glycerin, ethylene glycol, diethylene glycol, propylene glycol, polyethylene glycol, polypropylene glycol, diethanolamine, and triethanolamine, etc.

Practical examples of polyamine compounds include ethylene diamine, diethylene triamine, triethylene tetramine, tetraethylene pentamine, polyamide resin which is a reaction product of polyamine and fatty acid, and polyamide-polyamine-epichlorohydrin resin, etc.

Of these examples of the crosslinking agent (C) mentioned above, polyglycidyl ether compounds, polyfunctional alcohol compounds, and polyamine compounds are preferable. Particularly preferable ones are ethylene glycol diglycidyl ether, propylene glycol diglycidyl ether, glycerine-1,3-diglycidyl ether, glycerin triglycidyl ether, and polyamide-polyamine-epichlorohydrin resin, because their crosslinking reaction temperature are low and they are economical in the aspect of energy cost.

The dose of the crosslinking agent (C) used in the invention may vary depending on the type of (C), type and degree of crosslinking of (A), and performance target of the improved water absorbing resin to be obtained, and the ratio of (A):(C) (by weight) is usually 100:(0.01 to 5), preferably 100:(0.05 to 3), and more preferably 100:(0.1 to 2). If the rate of (C) is less than 0.01, the effect of addition is not expressed sufficiently, or if more than 5, to the contrary, the crosslinking density is excessive, and the absorption capacity may be lowered.

In the invention, to treat the water absorbing resin particles (A) with aqueous solution of (B) and (C), generally, a mixed aqueous solution of (B) and (C) is sprayed to (A), or is added dropwise, and mixed. It is also possible to treat (A) with aqueous solution of (B) and (C) simultaneously or separately without premixing them.

The apparatus used in mixing of (A), aqueous solution of (B), and (C) may be an ordinary blender, for example, a cylindrical blender, a screw blender, a screw extruder, a turbulizer, a Nauta blender, a V-shaped rotating mixer, a ribbon blender, a double arm type kneader, a fluidized bed mixer, an air blender, a rotating disc type mixer, and a roll mixer.

The reaction of the mixture of (A), aqueous solution of (B), and (C) obtained in this process usually requires heating. Or blending and heating may be done simultaneously. In this case, the reaction refers to the crosslinking reaction by the crosslinking agent (C).

For this heating, driers and heaters may be used, for example, a hot-air drier, a rotary drier, a paddle drier, a rotating disc drier, a fluidized bed drier, a belt type drier, a Nauta type heater, and an infrared drier.

The heating temperature varies with the type and dose of (C), and the content of water in aqueous solution of (B), and is usually 80° to 230° C., or preferably 100° to 230° C., or more preferably 110° to 200° C. If the temperature is less than 80° C., it takes a long time in heating, which is not only uneconomical, but also insufficient in the crosslinking reaction for achieving the effect of the invention depending on the type and content of (C). At temperatures exceeding 230° C., coloring or thermal decomposition of the water absorbing resin may occur.

The heating time varies with the type and dose of (C), the content of water in the aqueous solution of (B), and the heating temperature, and is usually 5 minutes or longer, and preferably 5 to 60 minutes. If less than 5 minutes, it is often necessary to raise the heating temperature, and it is not only uneconomical, but also insufficient in the progress of crosslinking reaction for achieving the effect of the invention depending on the type and dose of (C).

This heating may be executed in vacuum or in an inert gas flow atmosphere as required. By heating in vacuum or in an inert gas flow atmosphere, it is possible to suppress the coloring, oxidation, thermal deterioration or the like of the water absorbing resin. As the example of inert gas flow, nitrogen, helium or carbon dioxide may be listed among others. In the invention, by the presence of the aqueous solution of (B), the crosslinking agent (C) can hardly permeate sufficiently into the inside of the water absorbing resin particles (A), and the concentration of crosslinking agent on the surface of the water absorbing resin particles becomes high, so that, it is estimated, mainly the surface vicinity of the water absorbing resin particles may be crosslinked.

Generally, when the water absorbing resin particles are crosslinked throughout from the surface to the inside thereof, if the degree of crosslinking is low, the absorbency under the pressure-free state may be heightened, but the absorbency under the pressurized state tends to be lowered. To the contrary, if the degree of crosslinking is high, the absorbency under the pressurized state may be somewhat heightened, but the the absorbency under pressure-free state is lowered. The water absorbing resin particles of the invention are crosslinked mainly the surface vicinity thereof, and therefore the present invention is capable of producing water absorbing resin which is high in both initial absorption rate and total absorbency, whether in a pressure-free state or in a pressurized state.

The depth of the surface-crosslinking from the surface of the water absorbing resin particles in this invention—the vicinity of the surface being crosslinked by a crosslinking agent—is varied, depending on the particle size of the water absorbing resin particles (A) and the target of the performance of obtainable improved water absorbing resin. However, the depth is generally 40% or less, preferably 20% or less, more preferably 10% or less than the radius of the water absorbing resin particles (A).

The water absorbing resin of the invention is obtained by the method of the invention, and its absorption characteristics can be controlled depending on the purpose of use, and the absorbency under pressure-free state to physiological saline solution is usually 50 times or more, and preferably 55 times or more, and the absorbency under the pressurized state to physiological saline solution is 30 times or more, and preferably 35 times or more. Herein, the physiological saline solution is an aqueous solution of sodium chloride having a concentration of 0.85 to 0.95 wt. %.

Therefore, due to the excellent absorption performance, only a smaller quantity is required if the same absorption performance is needed, and the bulk is not increased, so that the cost may be reduced. Furthermore, the water absorbing resin of the invention is small in the content of the water-soluble component, and excellent in the dry feeling of the gel after absorbing water, showing a crisp touch, and hence, for example, when applied in paper diapers, the dry touch of the surface of the paper diaper after urination is favorable.

The water absorbing resin of the invention may be added, at an arbitrary step of the method of the invention, with additives such as antiseptics, antimold agents, disinfectants, antioxidants, ultraviolet-absorbers, coloring agents, perfumes, deodorants, inorganic powders, and organic fibrous matters.

Hereinafter, the invention is further described below by referring to examples and comparative examples, but it must be noted that the invention is not limited to them alone. The initial absorption rate and the absorbency under the pressure-free state, the initial absorption rate and the total absorbency under the pressurized state, and dry feeling of water absorbing gel were measured in the following methods. Hereinafter, % represents wt. % unless otherwise noted.

Initial absorption rate and total absorbency under the pressure-free state:

A tea bag made of 250-mesh nylon net was added with 1 g of water absorbing resin, and immersed in physiological saline solution having concentration 0.9% for 5 minutes and 60 minutes individually, and was drained for 15 minutes each, and the weight gain was measured. The absorption amount after immersing for 5 minutes was obtained as the initial absorption rate under the pressure-free state to the physiological saline solution, and the absorption amount after immersing 60 minutes was obtained as the total absorbency under the pressure-free state to the physiological saline solution.

Initial absorption rate and total absorbency under the pressurized state:

A cylindrical plastic tube (inner diameter 30 mm, height 60 mm) having a 250-mesh nylon net glued to the bottom was added with 0.1 g of water absorbing resin (sample rolled and formed in a disc of 30 mm in diameter), and a weight of 30 mm in outer diameter was put thereon so as to load with 20 g/cm$^2$.

A tube containing the polymer sample was then immersed in a vessel (diameter: 12 cm) filled with 60 ml of physiological saline solution (concentration 0.9%) and let stand with the nylon net side down. The weight gain of the sample by absorbing the physiological saline solution was measured 5 minutes and 60 minutes later. The 10-fold value of the absorption in 5 minutes was determined as the initial absorption rate under the pressurized state to the physiological saline solution, and the 10-fold value of the absorption in 60 minutes as the total absorbency under the pressurized state to the physiological saline solution.

Dry feeling of hydrogel:

The surface of the hydrogel after measuring the absorbency under the pressurized state to physiological saline solution was pressed with finger, and its dry feeling was evaluated in the following four ranks.

⊚: Good dry feeling
○: Satisfactory dry feeling but slightly inferior to ⊚
△: Poor dry feeling, somewhat slippery
×: Very slippery

EXAMPLE 1

1,000 parts of 25% aqueous solution of acrylic acid salt monomer composed of 72.95 mol % of sodium acrylate, 27 mol % of acrylic acid, and 0.05 mol % of methylene bisacrylamide was polymerized adiabatically by using 0.1 part of hydrogen peroxide and 0.03 part of ascorbic acid in nitrogen atmosphere, at an initial polymerization temperature of 10° C., and a gel polymer was obtained. This gel polymer was dried in a drum drier set at 180° C., and was ground to particle size of 20 to 145 mesh, and dry water absorbing resin particles (a) were obtained.

100 parts of water absorbing resin particles (a) were put in a juicer-mixer with a capacity of 2,000 ml, and while stirring, 4 parts of a crosslinking agent aqueous solution obtained by dissolving 10 wt. % of ethylene glycol diglycidyl ether (0.4 part to water absorbing resin particles (a)) in 10 wt. % aqueous solution of sodium propionate was added dropwise, and mixed sufficiently. The obtained mixture was heated for about 20 minutes at 150° C., and the water absorbing resin (1) of the invention was obtained.

In the obtained water absorbing resin particles (a) and water absorbing resin (1), the initial absorption rate, the total absorbency under the pressure-free state, the initial absorption rate and the total absorbency under the pressurized state were measured together with the dry feeling of the hydrogel. These results are shown in Table 1 together with the state of the water absorbing resin in the process of crosslinking reaction.

EXAMPLE 2

Using the water absorbing resin particles (a) obtained in Example 1, water absorbing resins (2) through (6) were obtained in the same manner as in Example 1, except that the sodium propionate used by 10 wt. % in Example 1 was replaced with the water-soluble compounds in the following type and content. That is:

30 wt. % of sodium propionate in the case of water absorbing resin (2);

20 wt. % of sodium lactate in the case of water absorbing resin (3);

20 wt. % of ethylene oxide 3-mol adduct of methanol in the case of water absorbing resin (4);

20 wt. % of ethylene oxide 3-mol adduct of butanol in the case of water absorbing resin (5); and 20 wt. % of ε-caprolactam in the case of water absorbing resin (6).

The initial absorption rate and the total absorbency under the pressure-free state, the initial absorption rate and the total absorbency under the pressurized state of the water absorbing resins (2) through (6), and the dry feeling of hydrogel were measured. The results are shown in Table 1 together with the state of the water absorbing resin in the process of crosslinking reaction.

EXAMPLE 3

100 parts of water absorbing resin particles (a) were put in a juicer-mixer with a capacity of 2,000 ml and stirred continuously, while 3 parts of a crosslinking aqueous solution obtained by dissolving 10 wt. % of polyamide-polyamine-epichlorohydrin resin (0.3 part to water absorbing resin (a)) in 30 wt. % of ethylene oxide 3-mol adduct of methanol were added dropwise and mixed sufficiently. The obtained mixture was heated for about 20 minutes at 150° C., and the water absorbing resin (7) of the invention was obtained.

In the obtained water absorbing resin (7), the initial absorption rate and the total absorbency under the pressure-free state, and the initial absorption rate and the total absorbency under the pressurized state were measured together with the dry feeling of hydrogel. The results are shown in Table 1 together with the state of the water absorbing resin in the process of crosslinking reaction.

EXAMPLE 4

Using the water absorbing resin particles (a) obtained in Example 1, water absorbing resins (8) to (10) were obtained in the same manner as in Example 1, except that the ethylene glycol diglycidyl ether in Example 1 was replaced by the following crosslinking agents, and that the heating temperature of the mixture was 190° C. That is, Glycerin was used in the case of water absorbing resin (8);

Polyethylene glycol 200 in the case of water absorbing resin (9); and

Triethylene tetramine in the case of water absorbing resin (10).

The initial absorption rate and the total absorbency under the pressure-free state, and the initial absorption rate and the total absorbency under the pressurized state of the water absorbing resins (8) to (10), and the dry feeling of hydrogel were measured. The results are shown in Table 1 together with the state of the water absorbing resin in the process of crosslinking reaction.

EXAMPLE 5

Using the water absorbing resin particles (a) obtained in Example 1, water absorbing resin (11) was obtained in the same manner as in Example 1, except that the crosslinking aqueous solution was used in the amount of 7 parts instead of 4 parts in Example 1. The initial absorption rate and the total absorbency under the pressure-free state, and the initial absorption rate and the total absorbency under the pressurized state of the water absorbing resin (11), and the dry feeling of hydrogel were measured. The results are shown in Table 1 together with the state of the water absorbing resin in the process of crosslinking reaction.

EXAMPLE 6

A water absorbing resin (12) was obtained in the same manner as in Example 1, except that the water absorbing resin particles (a) in Example 1 were replaced with dry water absorbing resin particles (b) of crosslinked copolymer of starch-grafted sodium acrylate ("SAN-WET IM-1000" of Sanyo Chemical Industries, Ltd.). The initial absorption rate and the total absorbency under the pressure-free state, and the initial absorption rate and the total absorbency under the pressurized state of the water absorbing resin (12), and the dry feeling of hydrogel were measured. The results are shown in Table 1 together with the state of water absorbing resin in the process of crosslinking reaction.

COMPARATIVE EXAMPLE 1

A comparative water absorber (1) was obtained in the same manner as in Example 1, except that sodium propionate was not added to the crosslinking agent aqueous solution in Example 1. The initial absorption rate and the total absorbency under the pressure-free state, and the initial absorption rate and the total absorbency under the pressurized state of the comparative water absorber (1), and the dry feeling of hydrogel were measured. The results are shown in Table 1 together with the state of the water absorbing resin in the process of crosslinking reaction.

COMPARATIVE EXAMPLE 2

A comparative water absorber (2) was obtained in the same manner as in Example 1, except that ethylene glycol diglycidyl ether was not added to the crosslinking agent aqueous solution in Example 1. The initial absorption rate and the total absorbency under the pressure-free state, and the initial absorption rate and the total absorbency under the pressurized state of the comparative water absorber (2), and the dry feeling of hydrogel were measured. The results are shown in Table 1 together with the state of water absorbing resin in the of process of crosslinking reaction.

COMPARATIVE EXAMPLE 3

A comparative water absorber (3) was obtained in the same manner as in Example 1, except that sodium propionate was not contained, and that 20 parts of crosslinking agent aqueous solution dissolving 2 wt. % of ethylene glycol diglycidyl ether was used in Example 1. The initial absorption rate and the total absorbency under the pressure-free state, and the initial absorption rate and the total absorbency under the pressurized state of the comparative water absorber (3), and the dry feeling of hydrogel were measured. The results are shown in Table 1 together with the state of the water absorbing resin in the process of crosslinking reaction.

TABLE 1

| | | State during reaction | Absorbency under pressure-free state 5 minutes later | Absorbency under pressure-free state 1 hours later | Absorbency under pressurized state 5 minutes later | Absorbency under pressurized state 1 hour later | Dry feeling of hydrogel |
|---|---|---|---|---|---|---|---|
| Example 1 | Particles (a) | — | 29 | 64 | 8 | 17 | X |
| | Resin (1) | Excellent | 48 | 60 | 28 | 41 | ⊙ |
| Example 2 | Resin (2) | Excellent | 46 | 60 | 25 | 38 | ⊙ |
| | Resin (3) | Excellent | 47 | 61 | 23 | 38 | ⊙ |
| | Resin (4) | Excellent | 49 | 62 | 27 | 40 | ⊙ |
| | Resin (5) | Excellent | 50 | 60 | 28 | 41 | ⊙ |
| | Resin (6) | Excellent | 48 | 61 | 26 | 39 | ⊙ |
| Example 3 | Resin (7) | Excellent | 50 | 62 | 30 | 41 | ⊙ |
| Example 4 | Resin (8) | Excellent | 50 | 58 | 30 | 40 | ⊙ |
| | Resin (9) | Excellent | 46 | 60 | 24 | 38 | ⊙ |
| | Resin (10) | Excellent | 51 | 59 | 28 | 39 | ⊙ |
| Example 5 | Resin (11) | Excellent | 52 | 58 | 30 | 39 | ⊙ |
| Example 6 | Particles (b) | — | 25 | 63 | 4 | 8 | X |
| | Resin (12) | Excellent | 47 | 60 | 22 | 37 | ⊙ |
| Comparative Example 1~3 | Comparative water absorber (1) | Coagulated | 30 | 60 | 10 | 20 | Δ |
| | (2) | Excellent | 27 | 62 | 6 | 12 | X |
| | (3) | Coagulated | 32 | 55 | 12 | 24 | Δ |

Thus, the process for producing improved water absorbing resin of the invention brings about the following effects.

① The method of the invention is an industrially simple process, and thus the improved water absorbing resins of the invention may be manufactured at low cost.

② Since the aqueous solution of water-soluble compound is hardly absorbed in water absorbing resin particles, mutual coagulation of resin particles to form lumps does not take place in the process of treating the water absorbing resin particles with the aqueous solution of water-soluble compound and crosslinking agent, and therefore the working efficiency is excellent.

③ If the crosslinking agent is treated in the state of aqueous solution, the crosslinking agent hardly permeates into the central part of the resin particles, and therefore the surface vicinity of the particles is efficiently and homogeneously crosslinked.

④ Not using organic solvent, the step for removing organic solvent is not needed.

The improved water absorbing resin obtained by the process of the invention possesses the following features.

① The absorption capacity is excellent whether under no pressure or under pressure.

② When contacting with water, the water absorbing resin particles do not form lumps, and they have a superior initial absorption rate.

③ The dry feeling of the gel after absorbing aqueous liquid is excellent, and the gel has a crisp touch without slipperiness or clamminess.

④ The content of the water-soluble component is small.

With the above effects, the water absorbing resins of the invention obtained by the process of the invention are useful for various industrial purposes, for instance, water-absorptive pad, sanitary materials used in contact with human's body (e.g. paper diapers for infants or adults, sanitary napkin and incontinence pads); materials used in contact with foods, for instance, freshness retaining materials, cold retaining materials and drip absorbers; materials for separating water from oil or drying agents; water retainers for plant, soil, etc.; sludge solidification agents; anti-dewing agents; water blocking materials or packing materials for civil engineering and construction work purposes; and water sealing materials for electric wire cables and optical fiber cables etc.

We claim:

1. A process for producing a water absorbing resin product, comprising the steps of treating particles of water absorbing resin (A) with an aqueous solution of water soluble compound (B) and crosslinking agent (C), and reacting the crosslinking agent with the particles of resin to obtain resin particles which are crosslinked in the vicinity of the surface:

wherein water absorbing resin A is selected from the group of polymers which contain a functional group selected from carboxylic acid, carboxylic acid anhydride, amide, neutralized carboxylic acid and partially neutralized carboxylic acid;

wherein said water soluble compound (B) is at least one water soluble compound selected from the group consisting of alkylene-oxide adducts of monofunctional alcohols (1), monofunctional salts of organic acid (2), and lactams (3), and inert to (A) and (C); and wherein said crosslinking agent (C) has two or more functional groups reacting with (A).

2. A process for producing a water absorbing resin product according to claim 1, wherein the concentration of the water soluble compound (B) in the aqueous solution of the water soluble compound (B) is in a range of 2 to 60 wt. %.

3. A process for producing a water absorbing resin product according to claim 1, wherein the ratio by weight of the water absorbing resin (A) and the aqueous solution of the water soluble compound (B) is in a range of 100:(1 to 10).

4. A process for producing a water absorbing resin product according to claim 1 wherein the absorbency of the aqueous solution of water soluble compound (B) in the water absorbing resin (A) is 5 times or less by weight.

5. A process for producing a water absorbing resin product according to claim 1, wherein the water soluble compound (B) is at least one compound selected from the group consisting of ethylene oxide 2-10 mole adducts of monofunctional alcohols, alkaline metal salts of propionic acid, and ε-caprolactams.

6. A process for producing a water absorbing resin product according to claim 1, wherein the ratio by weight of the water absorbing resin (A) to crosslinking agent (C) is in a range of 100:(0.01 to 5).

7. A process for producing a water absorbing resin product according to claim 1, wherein the reaction temperature is in a range of 80° to 230 °C.

8. A process for producing a water absorbing resin product according to claim 1, wherein the crosslinking agent (C) is at least one crosslinking agent selected from the group consisting of polyglycidyl ethers, polyfunctional alcohols and polyamines.

9. A process for producing a water absorbing resin product according to claim 1, wherein the crosslinking agent (C) is at least one crosslinking agent selected from the group consisting of ethyleneglycol diglycidyl ether, propyleneglycol diglycidyl ether, glycerin-1,3-diglycidyl ether, glycerin triglycidyl ether, and polyamide-polyamineepichlorohydrin resin.

10. A water absorbing resin product obtained from the process of claim 1, and having an absorbency under a pressure-fee state for physiological saline solution of 50 times or more, and an absorbency under a pressurized state for physiological saline solution of 30 times or more.

11. A process for producing a water absorbing resin product according to claim 3, wherein the ratio by weight of the water absorbing resin (A) and the aqueous solution of the water soluble compound (B) is in a range of 100:(2 to 5).

* * * * *